No. 617,728. Patented Jan. 17, 1899.
P. H. FARREY.
PIPE COUPLING.
(Application filed Feb. 3, 1898.)
(No Model.) 2 Sheets—Sheet 1.
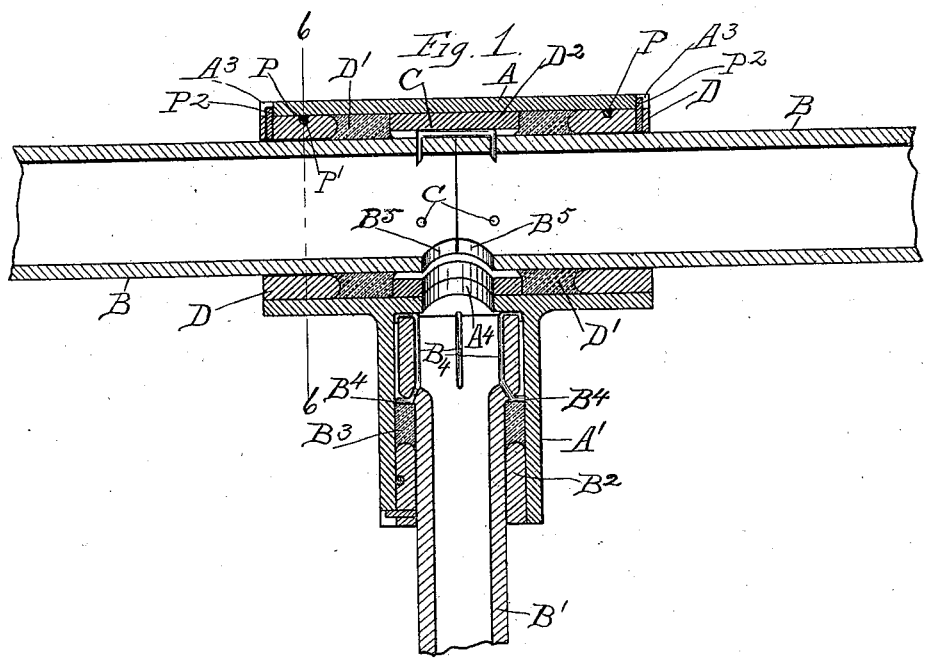
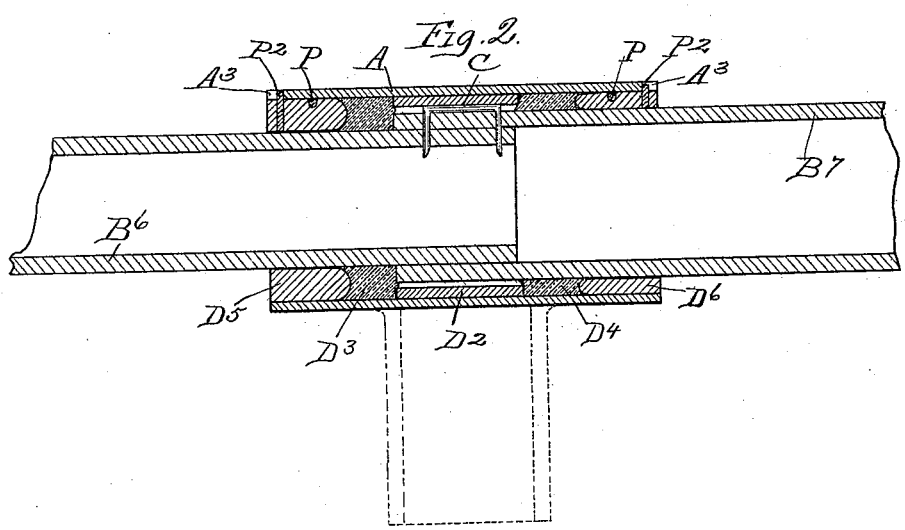
Witnesses:
C. H. Curtis
J. G. Curtis
Inventor:
Philip H. Farrey
By Mosher & Curtis
Attys No. 617,728. Patented Jan. 17, 1899.
P. H. FARREY.
PIPE COUPLING.
(Application filed Feb. 3, 1898.)
(No Model.) 2 Sheets—Sheet 2.
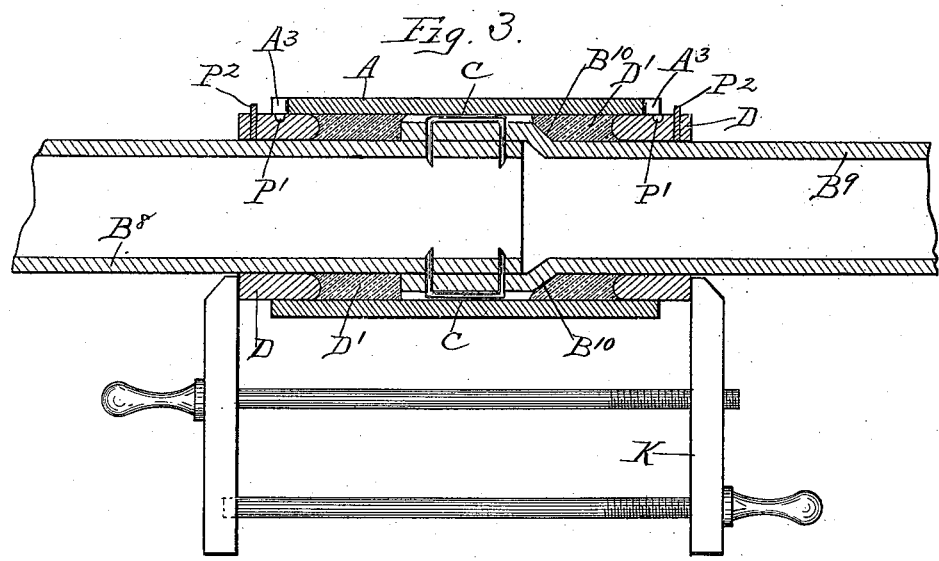
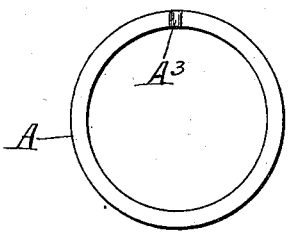
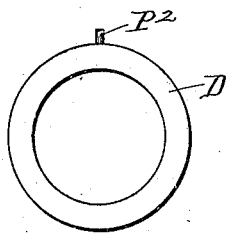
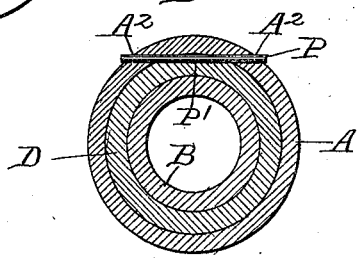
Witnesses: Inventor:
C. H. Curtis Philip H. Farrey
J. D. Curtis By Mosher & Curtis
attys

UNITED STATES PATENT OFFICE.

PHILIP H. FARREY, OF TROY, NEW YORK.

PIPE-COUPLING.

SPECIFICATION forming part of Letters Patent No. 617,728, dated January 17, 1899.

Application filed February 3, 1898. Serial No. 668,959. (No model.)

*To all whom it may concern:*

Be it known that I, PHILIP H. FARREY, a citizen of the United States, residing at Troy, county of Rensselaer, and State of New York, have invented certain new and useful Improvements in Pipe-Couplings, of which the following is a specification.

The invention relates to such improvements; and it consists of the novel construction and combination of parts hereinafter described and subsequently claimed.

Reference may be had to the accompanying drawings, and the letters of reference marked thereon, which form a part of this specification.

Similar letters refer to similar parts in the several figures.

Figure 1 of the drawings is a central longitudinal section of my improved pipe-coupling, showing the ends of two main pipes and one branch pipe coupled together, the main pipes being connected with their ends abutting one upon the other. Fig. 2 is a similar view showing two pipes of different diameters coupled together. Fig. 3 is a similar view showing one pipe end inserted within the expanded end of a pipe of the same size and both in position to be coupled together and also showing the manner in which the followers are operated by a tool. Fig. 4 is an end view of the coupling-sleeve detached. Fig. 5 is an end view of a follower detached. Fig. 6 is a transverse section, taken on the broken line 6 6 in Fig. 1, through the locking mechanism of the follower.

The object of my invention is to simplify the construction of pipe-couplings for lead and other pipes and to produce a cheap and effective coupling which can be easily applied.

Referring to the drawings, in Fig. 1, A represents the coupling-sleeve, having a lateral tubular branch A'.

B B are two pipes having their ends abutting one upon the other within the coupling-sleeve. These may be ordinary lead water-pipes.

C C are metal staples driven through or inserted in apertures in both pipes in a position to bridge the joint between the pipe ends and prevent the separation of said ends.

D D are the followers, which engage the packing-rings D' D', and $D^2$ is a resistance-tube located within the coupling-sleeve between the packing-rings, upon the opposite ends of which the respective packing-rings bear when compressed by the respective followers.

The metal staples are prevented from escaping or slipping out of the apertures in the pipes by the inclosing wall of the coupling-sleeve and the interposed wall of the resistance-tube.

The followers are severally secured in position by means of a locking-pin P, inserted through registering grooves and apertures in the follower and sleeve.

To permit the use of the locking-pin, the straight groove P' is formed in the periphery of the follower at right angles to the axial line of the follower, and apertures are formed in the wall of the coupling-sleeve, as at $A^2 A^2$, at right angles to the axial line of the sleeve and in alinement with each other in position to register with the groove P' when the follower has been inserted within the sleeve in the proper position.

To facilitate the location of the follower in the proper position within the sleeve for the groove and apertures to register with each other, I provide a guiding-slot $A^3$ in the end of the sleeve and provide the follower with a peripherally-projecting guiding and stopping pin $P^2$, adapted to enter said slot and insure the entrance of the follower at the proper rotative angle and adapted to engage the bottom of the slot when the follower has entered the sleeve sufficiently to bring said groove and apertures into alinement to receive the locking-pin.

The followers may be forced inwardly to compress the packing to the limit permitted by the stop-pins $P^2$ in any known manner.

The resistance-tube $D^2$ rests loosely within the coupling-sleeve and, being thus free to yield to force applied at either end, forms an equalizing medium between the packing-rings and insures the equal compression of both rings at all times.

By the use of an equalizing resistance between the packing-rings I am able to secure uniform compression of the two packing-rings, while using the comparatively inexpensive pin locking mechanism above described.

The branch pipe B' is secured in the tubular branch of the coupling-sleeve by means of the follower B² and packing B³, the inserted end of the pipe being expanded, as shown, and provided with the wire pins B⁴ B⁴, which are inserted through the wall of the pipe near the beginning of the expanded portion and severally have one end projecting exteriorly of the pipe in position to be engaged by the packing and the other end extended to and bent around the inner end of the pipe to prevent displacement.

The wall of the coupling-sleeve is apertured at A⁴, and the main pipes B and B are apertured at B⁵ to form a connecting passage-way between the main and branch pipes.

In Fig. 2 I have shown the end of a smaller pipe B⁶ inserted within the end of a larger pipe B⁷, said ends being held together by staples C, inserted through both pipes. The connected ends of the pipes are secured within the coupling-sleeve A by means of the packing-rings D³ and D⁴, resistance-tube D², and followers D⁵ and D⁶ in a manner similar to that above described in connection with Fig. 1, the difference in diameters of the coupled pipes being compensated by a corresponding difference in the thickness of the followers and packing-rings.

In Fig. 3 pipes of similar size are shown, the end of one being expanded to receive the other, B⁸ being the unexpanded pipe and B⁹ the expanded pipe. The staples C are inserted through both pipes, and the connected ends of the pipes are secured within the coupling-sleeve in the same manner as explained in connection with Fig. 1, except that the resistance-tube is omitted, the packing-rings engaging one the end of the expanded pipe and the other the shoulder B¹⁰, formed by the expanded portion of such pipe. In this construction the pipes themselves have the same freedom of movement within the coupling-sleeve permitted the resistance-tube in the construction shown in Fig. 1, which equalizes the pressure upon the packing-rings, although the inward movement permitted the followers is arbitrarily limited by the stops and pin locking mechanism, as above described.

I have shown in Fig. 3 a double-screw hand-clamp K, which forms a convenient tool for forcing the followers to their seats.

I am aware that a yoke connection has heretofore been applied to the neighboring ends of connected pipes; but in all such prior constructions it has been necessary to provide a specially-constructed form of either the yoke or the inclosing sleeve, or both. Thus the coupling-sleeve has been made of eccentric form, with a recess in its inner surface to receive the yoke, which in some cases was riveted to the sleeve and was made of resilient sheet metal adapted to engage specially-prepared notches in the outer surfaces of the connected pipes, and in other cases the yoke was made up of one or more pieces of sheet metal and separate pins or rivets connecting the sheet metal with the pipes.

It is characteristic of my invention that no special preparation of the connected pipes to receive the staple is necessary, the staple being of a common form and made of wire, which can be easily driven through the walls of the connected pipes, and that the coupling-sleeve is formed of a piece of ordinary plain cylindrical pipe or tubing which closely fits the stapled ends of the connected pipes, and without being specially formed therefor secures the inserted staple in position, while leaving the parts easily detachable.

What I claim as new, and desire to secure by Letters Patent, is—

1. In a pipe-coupling, the combination with a pair of pipes, of a staple driven through the neighboring ends of both pipes, a coupling-sleeve having a plain cylindrical inner surface inclosing and closely fitting the staple-connected ends of said pipes, whereby said staple is detachably held in position by said sleeve, and a pair of followers and packing, substantially as described.

2. In a branch-pipe coupling, the combination with a coupling-sleeve having a lateral tubular branch, and means for connecting the sleeve to the main pipes; of a branch pipe inserted in the tubular branch of the coupling-sleeve; a plurality of wire pins inserted through the wall of the branch pipe and projecting exteriorly thereof within the tubular branch of the coupling-sleeve; a follower; and packing inserted between the follower and said pins, substantially as described.

3. In a pipe-coupling, the combination with the pipes and packing; of a coupling-sleeve having two transverse apertures in line with each other; a follower inserted within the sleeve and having a transverse groove adapted to register with said apertures; a guide and stop adapted to locate the follower within the sleeve with said groove and apertures in alinement with each other; and a locking-pin adapted to be secured in said alined groove and apertures, substantially as described.

4. In a pipe-coupling, the combination with a coupling-sleeve; of a pair of followers and packing-rings in the opposite ends of the sleeve; an equalizing resistance between the packing-rings; and a locking-pin inserted transversely through each follower and the inclosing sleeve, substantially as described.

5. In a pipe-coupling, the combination with a coupling-sleeve, followers and packing, of a pair of pipes having the end of one inserted within the end of the other and their lapping ends inclosed within the sleeve, and a fastening device inserted through the lapping ends of said pipes and held in place by the inclosing wall of the sleeve, substantially as described.

In testimony whereof I have hereunto set my hand this 21st day of January, 1898.

PHILIP H. FARREY.

Witnesses:
FRANK C. CURTIS,
O. H. EDDY.